July 22, 1958
L. D. GREENLAND
2,844,084
EDGING TOOL FOR SIDEWALKS AND THE LIKE
Filed Nov. 3, 1954
4 Sheets-Sheet 1
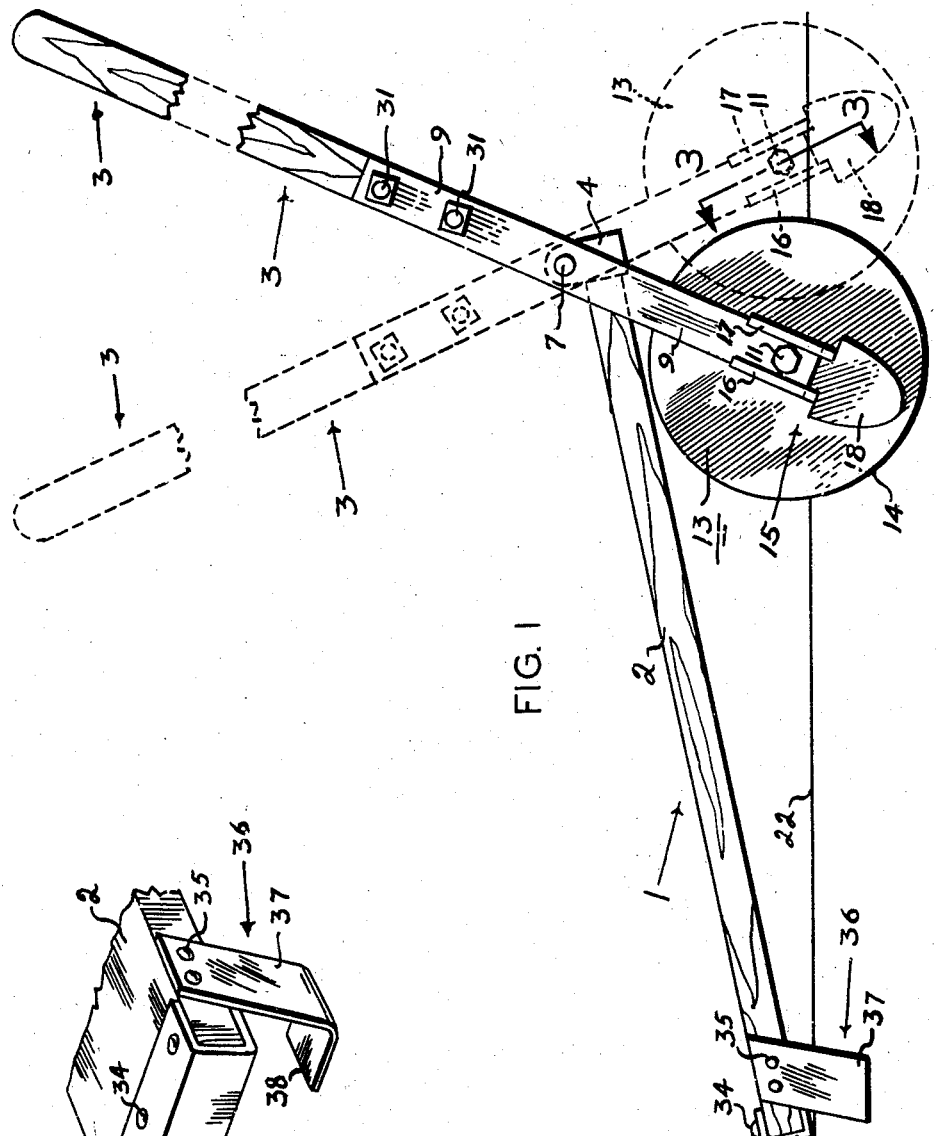
Lloyd D. Greenland
INVENTOR,
BY Bair, Freeman
& Molinare
ATTORNEYS July 22, 1958   L. D. GREENLAND   2,844,084
EDGING TOOL FOR SIDEWALKS AND THE LIKE
Filed Nov. 3, 1954   4 Sheets-Sheet 2

Lloyd D. Greenland
INVENTOR,

BY Bair, Freeman
& Molinare
ATTORNEYS

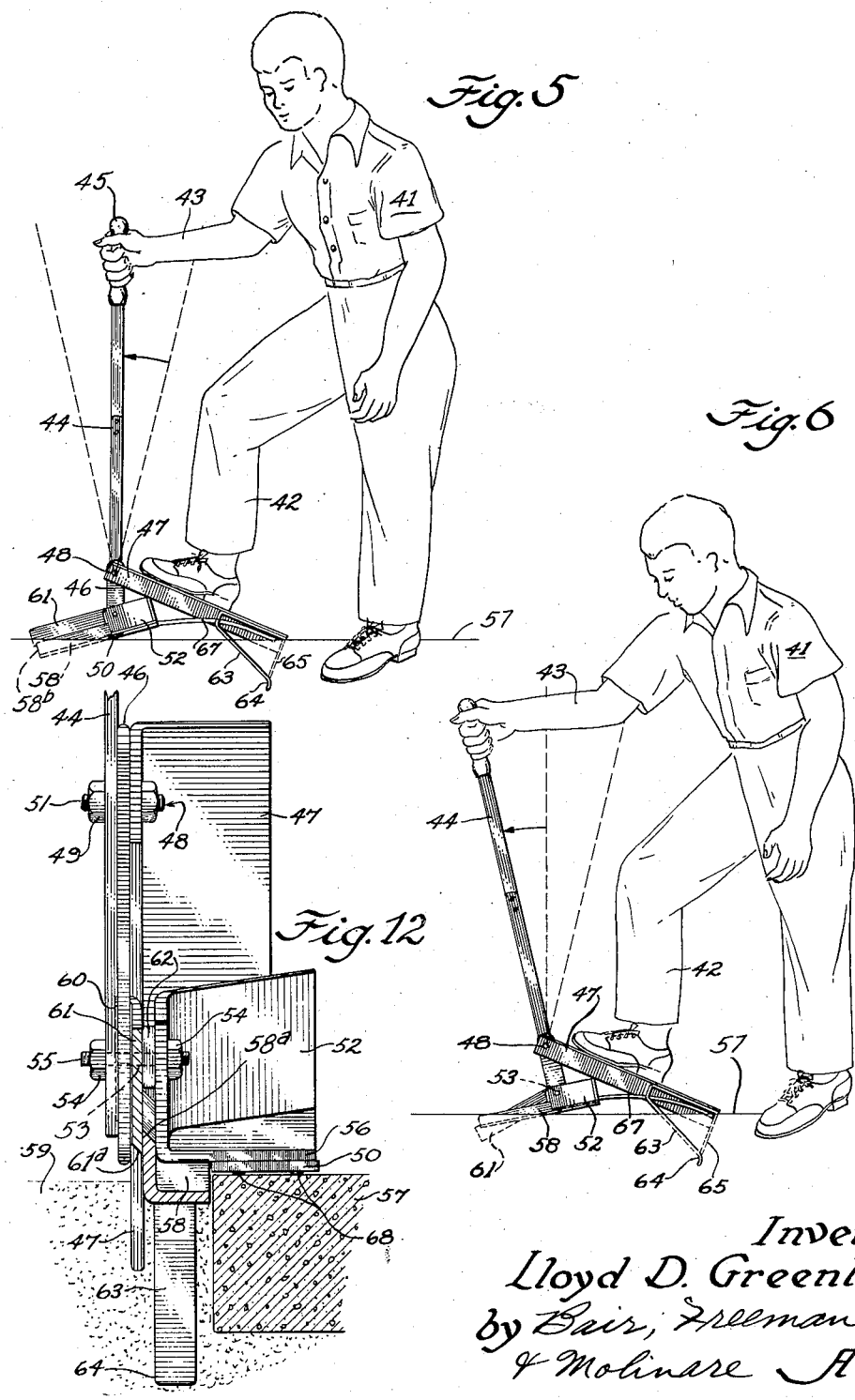

July 22, 1958 — L. D. GREENLAND — 2,844,084
EDGING TOOL FOR SIDEWALKS AND THE LIKE
Filed Nov. 3, 1954 — 4 Sheets-Sheet 4
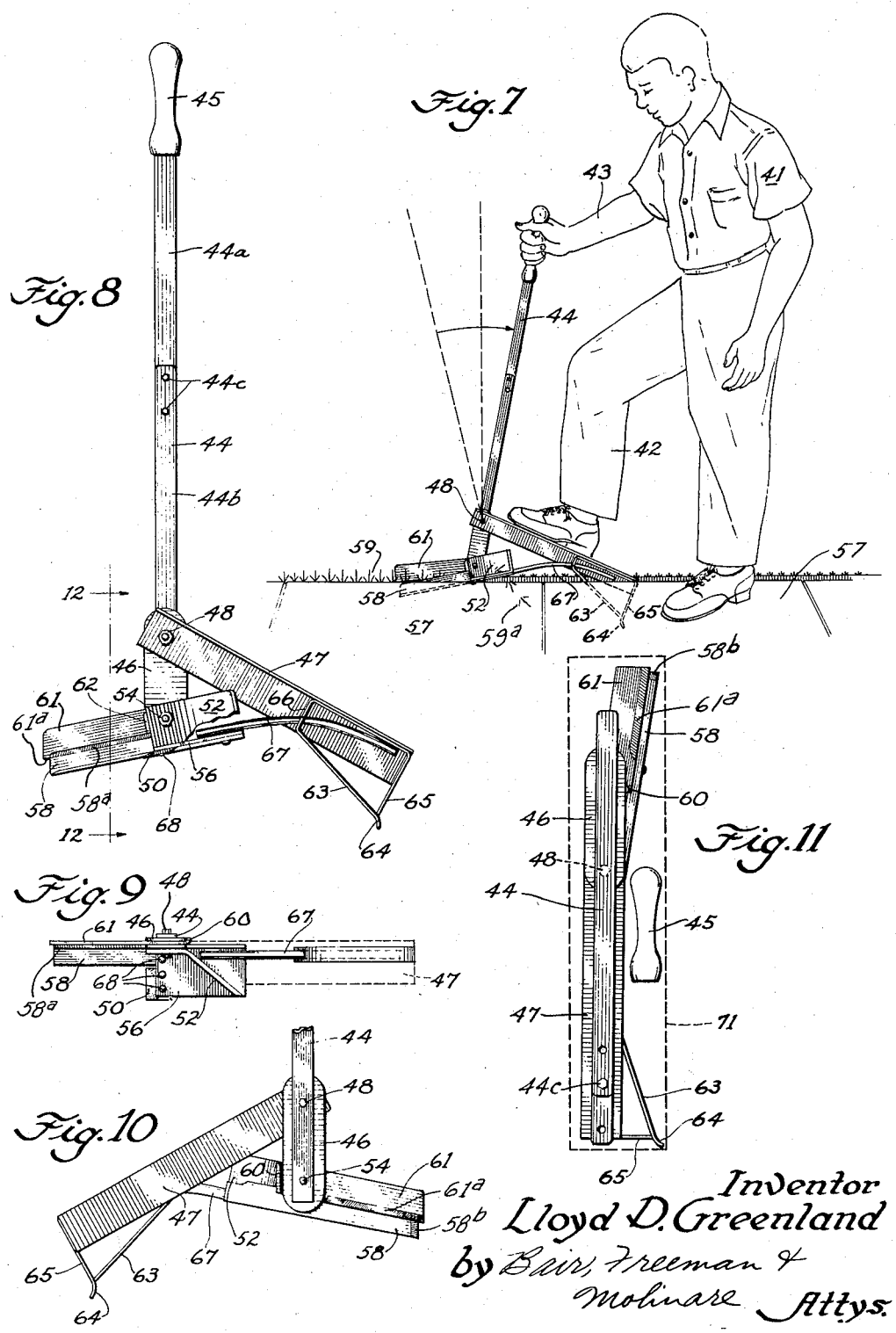
Inventor
Lloyd D. Greenland
by Bair, Freeman & Molinare Attys.

2,844,084

EDGING TOOL FOR SIDEWALKS AND THE LIKE

Lloyd D. Greenland, Des Moines, Iowa, assignor of one-half each to Verna O. Wade, West Des Moines, and Richard E. Williams, Des Moines, Iowa Application November 3, 1954, Serial No. 466,483

6 Claims. (Cl. 97—227)

The present invention relates to tools for trimming along the edges of sidewalks, drive-ways, and the like, and more particularly to edging tools adapted only for trimming away grass, but also for cutting a groove in the earth along such traffic ways.

A principal object of the invention is to provide a tool which will make two parallel cuts into the earth along the edge of a walk, and which will then cleanly gouge out the strip of earth or sod between the cuts.

This application is a continuation-in-part of my co-pending application, Serial No. 314,507, filed October 13, 1952, now abandoned.

A further object is to provide a tool for this purpose which is manually operable on a principle involving a fulcrum rigidly positioned by a person's foot, an upstanding lever arm operable over the fulcrum by the person's hands, and parallel cutting blades carried by the lower end of the lever arm below the fulcrum and adapted to be forced through the sod by the hand operation of the lever arm.

Another object is to provide a tool of this class with a follow-up gouging blade which will cleanly sever the sod strip from the earth between the parallel cuts.

An additional object is to provide a tool of this class which is easy to operate, positive in action, and comparatively cheap to manufacture.

Other objects will be apparent from the following description when taken in conjunction with the accompanying drawings, wherein:

Figure 1 is a perspective view, the solid lines showing the device in position to make a cut, and the dotted lines illustrating the lever arm in the position which it assumes after a cut has been made;

Figure 4 is an enlarged fragmentary perspective view detailing a portion of the device;

Figure 5 is a side view of another embodiment of the invention showing an edging tool with an operator positioning the handle in its central upright position;

Figure 6 is a view similar to Figure 5 in which the operator has moved the handle to its foremost position;

Figure 7 is a view similar to Figure 5 showing the handle positioned in its rearward position, Figure 8 is a side view of the edging tool partially in section;

Figure 9 is a top plan view of the edging tool;

Figure 10 is a portion of a side view of the edging tool on the opposite side to that shown in Figure 8;

Figure 11 is a view of the edging tool when it is collapsed and placed in a box for shipping or storage; and Figure 12 is a sectional view taken on the line 12—12 of Figure 8.

Like characters of reference designate like parts in those figures of the drawings in which they occur.

In the drawings:

Figure 3:
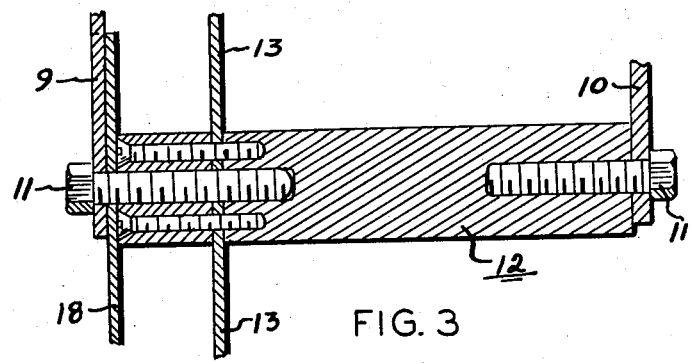
Figure 3 is a vertical sectional view taken substantially along the line 3—3 of Figure 1.

The reference numeral 1 indicates, as a whole, a fulcrum member which is composed of an elongated rigid block or panel 2 which is preferably made of wood. The panel 2 lies at an upward and forward facing angle, due to its forward end being connected to an elongated lever arm 3 above the earth's surface. The raised forward end of the block or panel 2 is provided with a metal stirrup which is composed of two vertical parallel arms 4 and 5 having their lower ends connected by a flat strap portion 6. The upper forward end of the block 2 is nested or cradled on the strap portion 6 between the two arms 4 and 5. The upper ends of the two arms 4 and 5 are alignedly perforated to receive rivets or pivot pins 7 and 8 which pass through two vertical legs 9 and 10 of a bracket structure 30 which is bolted rigidly at its upper end to the lower end of the lever arm 3. Bolts 31 make the connection.

The vertical legs 9 and 10 of the bracket extend downwardly beyond the strap portion 6 of the stirrup in parallel relation to each other, and their lower end portions are alignedly perforated transversely to receive a pair of horizontal shafts 11. The shafts 11 support the two ends of roller 12, which may be made of any suitable rigid or semi-rigid material such as wood, metal or of a rubber composition. Keyed or otherwise rigidly attached to the roller 12 at a desirable distance from the bracket leg 9, there is provided a metal disc 13 having a sharp peripheral cutting edge 14 ground thereon. The cutting disc 13 is considerably greater in diameter than that of the roller 12.

As best illustrated in Fig. 1, a cutting blade attachment 15 is removably connected to the lower end of the leg 9 of the bracket. The blade attachment 15 consists substantially of two spring metal flanges 16 and 17 which are adapted to frictionally clamp the opposite edges of the leg 9, and further consists of an arcuate-edged depending knife 18. The arrangement is such that the disc 13 and the knife 18 depend substantially an equal distance below the roller 12, so that downward pressure on the lever arm 3, or upon the bracket, will cause both the disc 13 and the knife 18 to cut into the earth's surface 20 at the side of a conventional sidewalk or drive-way 21, thus bringing the roller 12, which is revolvable, and revolves slightly even when actuated by the movement of the lever arm 3 into contact with the upper surface 22 of the walk. The roller 12 is actually an arcuate surfaced shoe upon which the tool may be rocked upon the walk surface 22, for repositioning the lever arm 3 for the next cutting action of the disc 13 and the knife 18.

The front and lower end of the block 2 is enveloped by a metal wear shoe 33 which is held thereon by rivets or studs 34.

Adjacent the shoe 33, and attached to that edge of the block 2 which lies nearest to the bracket leg 9 by studs 35, is a depending earth gouging blade 36 which is substantially L-shaped in configuration. The blade 36 is preferably made of strap metal and has a substantially vertical leg portion 37, the upper end of which is connected to the block 2 by studs 35, and also having an inwardly bent horizontal foot portion 38. The forward or leading edges 37A and 38A of the blade portions 37 and 38 are sharpened to provide earth or sod cutting surfaces, and the blade is so located that these leading cutting edges are behind and in alignment with the space lying between the two cutting blades 13 and 18 which are supported by the lever arm bracket 30.

Figure 2:
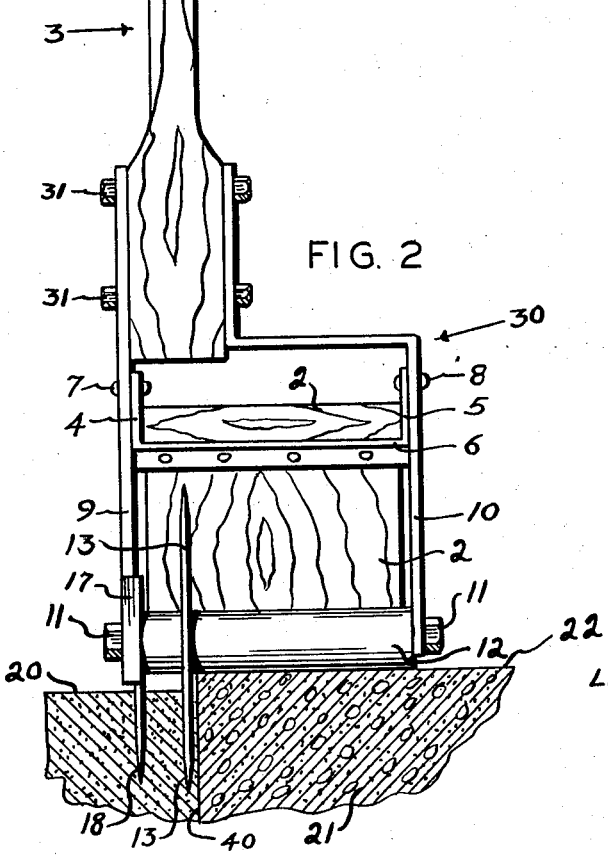
Figure 2 is a front elevational view.

In operation, the cutting disc 13 is placed at the vertical side edge 40 of the walk 21, with the lever arm 3 in an upright position so that the roller 12 extends horizontally over the upper surface 22 of the walk. When the disc 13 is thus positioned, the fulcrum block 2 has its rear lower end resting upon the walk in alignment with the roller 12. The operator then places a foot upon the upper surface of the bracket 30 and forces both blades 13 and 18 downward into the earth's surface 20 (Fig. 2). This places the tool in the proper position for the initial strip cutting operation. The operator next places one of his feet on the upper surface of the fulcrum block 2 with sufficient downward force being exerted to hold the wear shoe 33 against rearward movement with relation to the walk. With the fulcrum block 2 thus held stationary, the upper end of the lever arm 3 is manually pulled in a rearward direction from its forward position as shown in solid lines to the rearward position, as illustrated in dotted lines in Fig. 1. Such rearward movement of the lever arm forces the cutting disc 13 and the knife 18 forwardly through the earth along the edge 40 of the walk 21.

The operator next either lifts his foot off or takes his weight off the block 2 and moves the upper end of the lever arm 3 in a forward direction, as shown in solid lines in Fig. 1. Such forward movement of the lever arm causes the fulcrum block 2 to be dragged forwardly along the walk 21. The operator's foot is again pressed down upon the fulcrum block 2 to hold it stationary, and the upper end of the lever arm 3 is again pulled rearwardly to the dotted line position of Fig. 1.

These operational steps are repeated until the desired length of earth strip has been cut by the disc 13 and knife 18. The gouging blade 36 is so arranged that as the fulcrum block 2 is thus advanced along the walk 21, the blade 36 projects downwardly into the earth's surface to cleanly sever the bottom of the earth or sod strip from the ground, thereby leaving a clean straight sided flat bottomed rectangular groove cut along the edge 40 of the walk 21.

The tool is so proportioned that the upper end of the lever arm 3 is approximately waist high on the operator, thus giving the operator sufficient leverage to easily pull the lever arm rearwardly to force the cutting disc 13 and the knife 18 in their forward groove cutting stroke.

Referring specifically to Figures 7–12, inclusive, for a detailed description of a second embodiment of the invention numeral 41 indicates generally an operator of the edging tool and numerals 42 and 43 indicate one leg and one arm respectively of the operator. Numeral 44 indicates generally an upright handle for the edging tool which comprises an upper member 44a, a lower member 44b and screws and nuts 44c for connecting the two together. A grip 45 is removably attached to the top of the handle 44 and a reenforcing member 46 is preferably welded to the bottom of the handle 44.

An L-shaped metallic foot rest member 47 is pivoted to the handle at 48 and extends toward the operator as viewed in Figures 5, 6 and 7. The pivot point 48 is provided by a screw 51 and nuts 49, as best shown in Figure 12.

A scoop member 52 is secured to the lower portion 46 of the handle 44 by a bolt 55 and nuts 54. An upper grass cutting member 61 is also pivoted as shown at 53 on the bolt 55. A lower grass and ground cutting member 58, which is L-shaped in configuration, is bolted to a horizontal portion 56 of scoop 52 and a wear plate 50 is likewise bolted to the scoop 52, numeral 68 indicating the bolts for serving both of said functions. The member 58 is provided with an upper cutting edge 58a cooperating with a lower cutting edge 61a on member 61, and a forward cutting edge 58b. The wear plate 50 is sharpened at both its front and rear edges and is removable at the bolts 68 so that when worn it can be reversed and its life thus doubled, and when both edges are worn it can be readily replaced.

As shown in Figure 12, the sidewalk is indicated by numeral 57 and the earth and grass by numeral 59.

A spacer 62 is provided between the cutting member 61 and the scoop 52 and is substantially equal in thickness to the lower cutting member 58. It is to be noted that the upper cutting member 61 is provided with a lock flange 60 at the rear thereof, so that when the nuts 54 are tightened on bolt 55 the cutting members, scoop and handle are all properly positioned for operation.

At the rear of the L-shaped member 47, there is positioned a triangularly shaped bracket 63 having a curved edge 64 for scooping dirt and a reenforcing back member 65 which also provides a stop for a rod 67, which is preferably welded to the rear of cutting member 58 and extends through an aperture 66 in the bracket 63. The rod is so curved as to keep the cutting member 58 at substantially the same angle throughout the various positions of operation.

Before describing the operation of the edging tool shown in Figures 7–12, inclusive, it is noted that the tool may be collapsed when placed in a box 71 for shipping or storage. This is accomplished by removing the grip 45, from the handle 44, removing one of the screws 44c, so that the handle will pivot about the other screw to the position shown in Figure 11 and loosening nuts 54, so that the catch 60 will be released and so that cutting members and the member 47 may be folded to a compact position.

In operation, the operator first positions the edging tool as shown in Figure 12 and places his foot and weight on the member 47, as shown in Figure 7, to force the forward edge 58b of the lower cutting member 58 into the ground 59 adjacent the sidewalk 57 and to force the curved portion 64 of the triangular bracket 63 into the ground in back of the cutting members. The handle 44 is then moved forwardly by the operator through the positions shown in Figures 5 and 6, whereupon the grass and earth are cut.

The scoop member 64 cuts the trench slightly deeper and cleans out any loose earth. After the operator has positioned the edging tool as shown in Figure 6 as limited by the rear end of the rod 67 engaging the member 65, the weight of his body is relaxed on the member 47. When the handle 44 is then returned to the position shown in Figure 7, the lower cutting member 58 is moved forwardly about the pivot point 53 and additional earth is gouged and the grass and earth are scooped ahead of the cutting members 58 and 61. The material which is cut and scooped is forced back into the scoop 52 and is thrown off onto the sidewalk 57. When the operator again moves the handle forwardly, the member 47 moves forwardly about the pivot 43 and the scoop 64 scoops up additional dirt from the trench while at the same time the grass is cut by the cutting edges 58a and 61a of members 58 and 61. It is obvious, therefore, that the edging tool will ratchet itself forwardly as the handle 44 is moved from one position to another and this ratcheting operation is inherent in the construction of the tool.

It will be noted that the same ratcheting operation is inherent in the construction of the tool as shown in Figures 1–4, inclusive, which is a distinct advantage in both embodiments of the invention.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. A walk edging tool comprising a ground cutting member, a foot rest member, and a generally upright handle, means for pivotally connecting the handle to the cutting member and to the foot rest member adjacent the bottom of the handle, means on said foot rest member adapted to retain it against retrograde movement when the weight of the operator is applied thereto, and to thereby result in movement of the cutting member forwardly when the handle member is moved in one direction, said foot rest member being moved forwardly by movement of the handle in the opposite direction when the weight of the operator on the foot rest member is relaxed, whereby the edging tool is ratcheted forwardly upon oscillation of the handle, said cutting member having two cutting edges thereon, one forwardly thereof for cutting a trench in the ground and one on the top for cutting grass, and a second cutting member rigidly secured to said handle having a cutting edge on the bottom thereof adapted to cooperate with the cutting edge on the top of the first cutting member to cut grass when the handle is moved in the direction to move the first cutting member forwardly.

2. A walk edging tool comprising a ground cutting member, a foot rest member and a generally upright handle member, a pivotal connection between the handle and the cutting member adjacent the bottom of the handle, a second pivotal connection between the handle and the foot rest member also adjacent the bottom of the handle, means on said foot rest member adapted to retain it against retrograde movement when the weight of the operator is applied thereto, and to thereby result in movement of the cutting member forwardly when the handle member is moved in one direction, said foot rest member being moved forwardly by movement of the handle in the opposite direction when the weight of the operator on the foot rest member is relaxed, whereby the edging tool is ratcheted forwardly upon operation of the handle alternately in one of said directions and then the other, said cutting member having two cutting edges thereon, one forwardly thereof for cutting a trench in the ground and one on the top for cutting grass, and a second cutting member rigidly secured to said handle having a cutting edge on the bottom thereof adapted to cooperate with the cutting edge on the top of the first cutting member to cut grass when the handle is moved in the direction to move the first cutting member forwardly.

3. A walk edging tool comprising a ground cutting member, a foot rest member, and a generally upright handle, means for pivotally connecting the handle to the cutting member and to the foot rest member adjacent the bottom of the handle, means on said foot rest member adapted to retain it against retrograde movement when the weight of the operator is applied thereto, and to thereby result in movement of the cutting member forwardly when the handle member is moved in one direction, said foot rest member being moved forwardly by movement of the handle in the opposite direction when the weight of the operator on the foot rest member is relaxed, whereby the edging tool is ratcheted forwardly upon oscillation of the handle, and a curved rod secured to the rear end of said ground cutting member, slidable through an intermediate portion of said foot rest member and engageable therewith in the forward position of said handle to limit the movement of said handle in relation to said foot rest member.

4. A walk edging tool comprising a ground cutting member, a foot rest member, and a generally upright handle, a second ground cutting member movable with said handle and cooperating with the first ground cutting member in shearing relation, means for pivotally connecting the handle to the first ground cutting member and to the foot rest member adjacent the bottom of the handle, means on said foot rest member adapted to retain it against retrograde movement when the weight of the operator is applied thereto, and to thereby result in movement of the cutting member forwardly when the handle member is moved in one direction, said foot rest member being moved forwardly by movement of the handle in the opposite direction when the weight of the operator on the foot rest member is relaxed, whereby the edging tool is ratcheted forwardly upon oscillation of the handle, said second cutting member having a locking flange engageable with one side of said handle.

5. A walk edging tool comprising a ground cutting member, a foot rest member, and a generally upright handle, a second ground cutting member movable with said handle and cooperating with the first ground cutting member in shearing relation, means for pivotally connecting the handle to the first ground cutting member and to the foot rest member adjacent the bottom of the handle, means on said foot rest member adapted to retain it against retrograde movement when the weight of the operator is applied thereto, and to thereby result in movement of the cutting member forwardly when the handle member is moved in one direction, said foot rest member being moved forwardly by movement of the handle in the opposite direction when the weight of the operator on the foot rest member is relaxed, whereby the edging tool is ratcheted forwardly upon oscillation of the handle, said second cutting member having a locking flange engageable with one side of said handle, said locking flange being releasable from said handle for folding said second cutting member to a position aligned with said handle.

6. A walk edging tool comprising a ground cutting member, a foot rest member, and a generally upright handle, a second ground cutting member movable with said handle and cooperating with the first ground cutting member in shearing relation, means for pivotally connecting the handle to the first ground cutting member and to the foot rest member adjacent the bottom of the handle, means on said foot rest member adapted to retain it against retrograde movement when the weight of the operator is applied thereto, and to thereby result in movement of the cutting member forwardly when the handle member is moved in one direction, said foot rest member being moved forwardly by movement of the handle in the opposite direction when the weight of the operator on the foot rest member is relaxed, whereby the edging tool is ratcheted forwardly upon oscillation of the handle, said second cutting member having a locking flange engageable with one side of said handle, said locking flange being releasable from said handle for folding said second cutting member to a position aligned with said handle, said handle being in two parts and foldable upon itself for packing purposes.

References Cited in the file of this patent

UNITED STATES PATENTS

| | | |
|---|---|---|
| 841,586 | Shidler | Jan. 15, 1907 |
| 1,714,817 | Randleman | May 28, 1929 |
| 1,721,661 | Hawney | July 23, 1929 |
| 1,978,492 | Glasier | Oct. 30, 1934 |
| 2,428,188 | Williams | Sept. 30, 1947 |
| 2,434,074 | Jeffers | Jan. 6, 1948 |
| 2,503,757 | Morgan | Apr. 11, 1950 |
| 2,560,882 | McCauley | July 17, 1951 |
| 2,592,450 | Mjelva | Apr. 8, 1952 |

FOREIGN PATENTS

| | | |
|---|---|---|
| 364,750 | Germany | Dec. 2, 1922 |